(12) United States Patent
Griffey et al.

(10) Patent No.: US 6,291,095 B1
(45) Date of Patent: Sep. 18, 2001

(54) FLEXIBLE BATTERY MOUNTING AND ADJUSTABLE BATTERY PACKAGE

(75) Inventors: Lisa K. Griffey, Anderson; James M. Murphy, Chesterfield, both of IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/455,138

(22) Filed: Dec. 6, 1999

(51) Int. Cl.[7] .............................. H01M 2/04; H01M 2/30
(52) U.S. Cl. ............................ 429/65; 429/121; 429/178; 174/138
(58) Field of Search .......................... 429/100, 90, 93, 429/65, 121, 178; 174/138

(56) References Cited

U.S. PATENT DOCUMENTS

| | | | |
|---|---|---|---|
| 4,064,328 | * 12/1977 | Allen | 429/121 |
| 4,455,356 | * 6/1984 | Barrett, Jr. | 429/66 |
| 4,562,125 | * 12/1985 | Davis | 429/65 |
| 5,626,984 | * 5/1997 | Albini | 429/178 |
| 5,663,009 | * 9/1997 | Stocchiero | 429/65 |
| 5,804,770 | * 9/1998 | Tanaka | 174/138 |
| 6,090,502 | * 7/2000 | Ingram | 429/65 |
| 6,147,471 | * 11/2000 | Hunter | 320/105 |
| 6,152,784 | * 11/2000 | Pyles | 437/764 |

FOREIGN PATENT DOCUMENTS

736917-A * 9/1996 (EP) .............................. H01M/4/30

* cited by examiner

Primary Examiner—Gabrielle Brouillette
Assistant Examiner—Mark Ruthkosky
(74) Attorney, Agent, or Firm—Margaret A. Dobrowitsky

(57) ABSTRACT

The present invention provides a flexible slide mounting member for use with a battery package which is disposed on a top surface of a battery and is electrically connected to terminal posts extending outwardly from the battery. In one embodiment, the flexible slide mounting member comprises an elongated member having a central opening extending the length of the flexible slide mounting member and has a rectangular cross section, wherein the central opening receives and retains a portion of the battery package. The flexible slide mounting member has a predetermined number of raised, retaining rails formed on an outer surface thereof, wherein the retaining rails complementarily engage retaining grooves formed on the portions of the housings which are received within the opening of the flexible slide mounting member. Accordingly, the flexible slide mounting member is designed to provide adjustment of the battery package relative to the terminal posts of the battery by permitting the housings of the battery package to be adjustably positionable within the flexible slide mounting member. Thus, the flexible slide mounting member provides adjustment not only for the large variation in terminal post location but also for a range of battery sizes.

14 Claims, 3 Drawing Sheets

FLEXIBLE BATTERY MOUNTING AND ADJUSTABLE BATTERY PACKAGE

TECHNICAL FIELD

The present invention relates generally to electrical storage batteries and more particularly, to a flexible battery mount which permits at least one unit to be properly located and mounted to the top of the battery.

BACKGROUND OF THE INVENTION

One common type of storage battery comprises a top terminal post design battery which typically includes a pair of terminal posts extending from a top surface of the battery. In batteries having top terminal posts, the terminal posts are made of a conductive material, e.g., a lead alloy material, with a cylindrical or frusto-conical shape. An electrical connection is typically made between the top terminal posts of the battery and an electrical conduit by a terminal post connector.

A variety of types of terminal post connectors are available to connect the electrical conduit to the battery in automotive type applications. Some of these include a conventional connector comprising a molded, generally U-shaped device with a bolt passing through the outwardly projecting yoke-like arms for securely clamping the connector to the battery post. Such connectors are usually die cast from lead or brass-lead alloy or other materials such as zinc alloy or copper alloy. Because of the bulky nature of these terminal post connectors, the top surface of the battery is further limited in terms of having available space for mounting at least one battery component or unit thereto As batteries become more advanced and continue to offer additional features to the consumer, manufacturers are investigating and are currently using battery units which are designed to operate by drawing power from the battery itself and ideally are located proximate the battery itself and more preferably would be attached to the terminal posts and be disposed on the top surface of the battery. In addition, manufacturers are investigating using electronic battery units which offer the consumer a number of safety and performance features. Such an electronics unit would be electrically connected to the battery and this it would be advantageous to mount the electronics unit directly on the battery itself. Accordingly, as batteries become more and more advanced, it is increasingly more important to use such external battery units.

Because of a considerable tolerance between battery posts of conventional batteries, it is very difficult to mount any type of unit directly to one or more of the top terminal posts of the battery. In other words the distance between the terminal posts themselves can vary from one battery to another and the location on the top surface of the battery where the terminal posts are formed may also vary from one battery to another. These tolerances between battery posts present difficulties for the manufacturer of a battery unit which is to be electrically connected to the terminal posts of the battery. Consequently, the battery units have commonly been mounted external to the battery, that is in a remote location proximate the battery, and then electrically connected to one or more of the terminal posts by using an electrical cable assembly and any necessary terminal connectors which provide the electrical connection between the terminal posts and the battery unit. The use of cabling and terminal connectors to remotely mount the battery unit takes up additional space in the compartment in which the battery is located and also adds complexity and increases costs for the overall mounting process.

Accordingly, there is a perceived need for the development of a mounting device which is designed to mount one or more battery units directly to at least one of the terminal posts of the battery and be able to accommodate existing tolerances between the battery terminal posts.

SUMMARY OF THE INVENTION

The present invention comprises a flexible slide mounting member for use with a battery package which is disposed on a top surface of a battery and is electrically connected to terminal posts extending outwardly from the battery. In one embodiment, the battery package includes a mechanical housing and an electronics housing. The mechanical housing is coupled to the electronics housing by the flexible slide mounting member of the present invention. More specifically, the flexible slide mounting member comprises an elongated member having a central opening extending the length of the flexible slide mounting member. In the exemplary embodiment, the flexible slide mounting member has a rectangular cross section and the central opening receives a portion of the mechanical and electrical housings in a retaining manner.

The flexible slide mounting member has a predetermined number of raised, retaining rails formed on an outer surface thereof, wherein the retaining rails complementarily engage retaining grooves formed on the portions of the housings which are received within the central opening of the flexible slide mounting member. By disposing one or more rails within one or more corresponding grooves, the flexible slide mounting member secures and mechanically holds the mechanical and electrical housings on the top surface of the battery, while at the same time providing an adjustable linking member which permits sliding adjustment of the housings relative to the flexible slide mounting member. Accordingly, the flexible slide mounting member is designed to provide adjustment of the housings relative to the terminal posts of the battery by permitting the housings to be adjustably positionable within the flexible slide mounting member. Thus, the flexible slide mounting member provides adjustment not only for the large variation in terminal post location but also for a range of battery sizes. In other words, the use of the flexible slide mounting member permits the battery package to be used with varying sized batteries, e.g., 8, 9, or 10 inch sizes, and the mounting of the battery package to the terminal posts of battery is not entirely dependent upon the location of the terminal posts or the considerable tolerances which may exist between terminal posts.

In a second embodiment, the battery package comprises a single unit having the mechanical and electronics components disposed within a single housing. In this embodiment, a pair of terminal compartments extend outwardly from both sides of the single housing. Each of the side compartments comprises a generally U-shaped member having a channel extending therethrough and an inner retaining surface which preferably includes a plurality of retaining rails. A pair of U-shaped terminal covers are adjustably retained to the complementary pair of side compartments. Each of the terminal covers includes a retaining slot which receives one end of a respective terminal compartment. One of the walls defining the retaining slot has a grooved surface for receiving and retaining the plurality of retaining rails of the side compartments.

The terminal covers provide adjustment of the battery package relative to the terminal posts by permitting the terminal covers to be slidably positionable relative to the side compartments so that the terminal covers extend a predetermined distance away from the end of the side compartment. Accordingly, the terminal covers permit the battery package to have an adjustable size which accommodates not only for the large variation in terminal post location but also for a range of battery sizes and the considerable tolerances which may exist between terminal posts.

The above-described and other features and advantages of the present invention will be appreciated and understood by those skilled in the art from the following detailed description, drawings, and appended claims.

BRIEF DESCRIPTION OF THE DRAWINGS

Referring now to the drawings wherein like elements are numbered alike in the several Figures.

DETAILED DESCRIPTION OF THE PREFERRED EMBODIMENT

Figure 1:
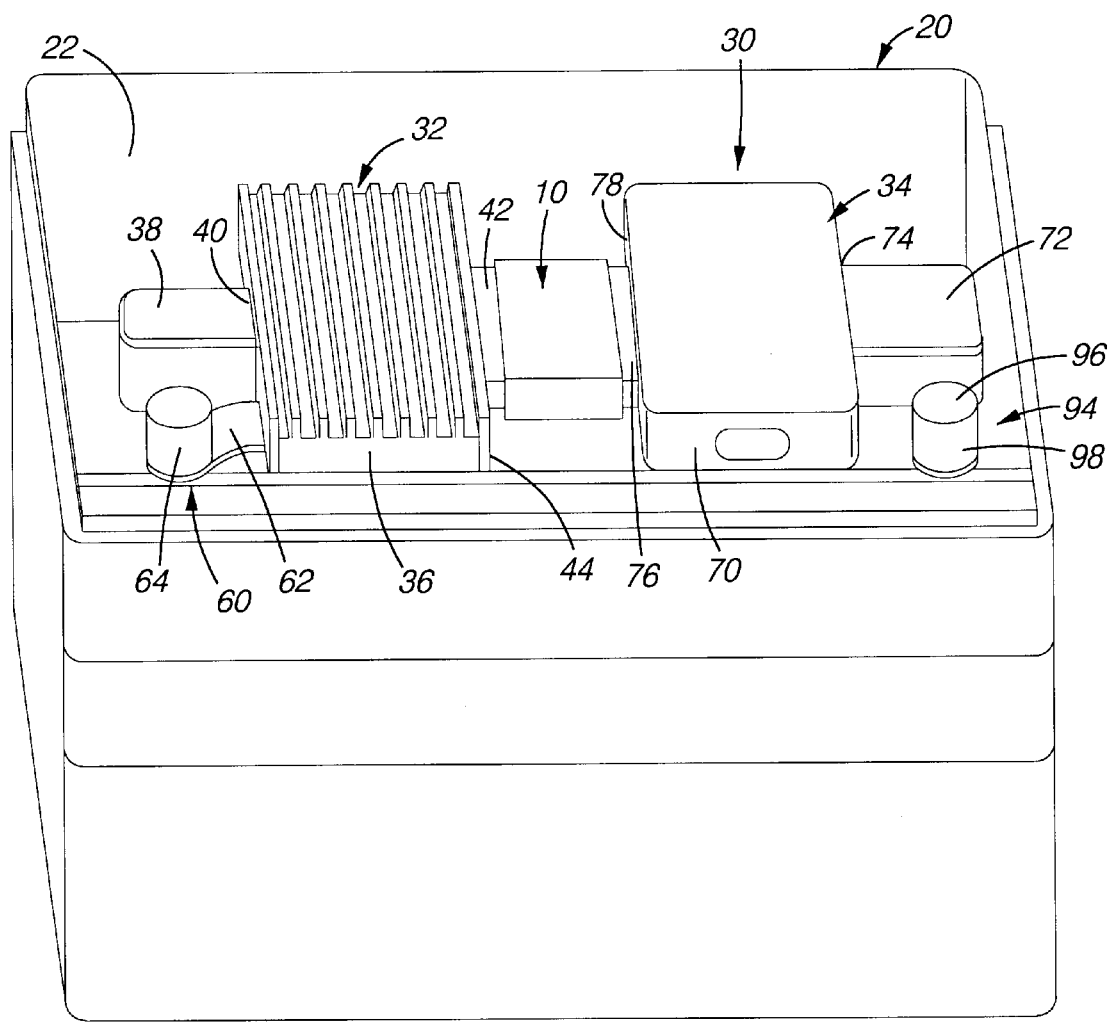
FIG. 1 is a perspective view showing a flexible mounting member of a first embodiment in accordance with the present invention coupled to a two compartment battery unit which is connected to a battery.
Figure 2:
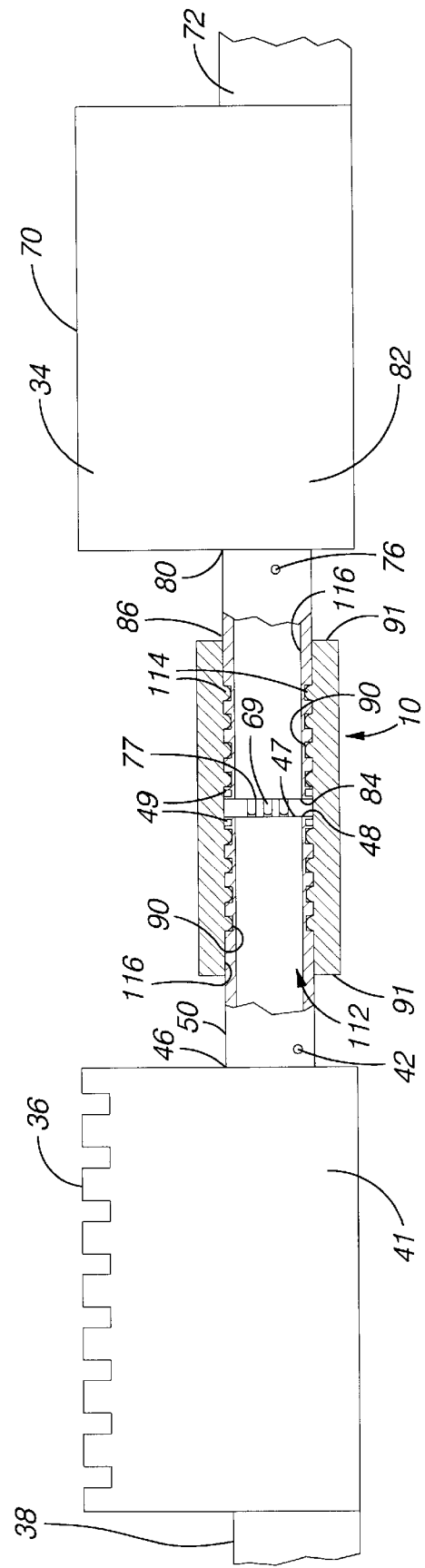
FIG. 2 is a partial side cross sectional view of the flexible mounting coupling a first compartment and a second compartment of the battery unit to one another.

Referring to FIGS. 1 and 2, an exemplary embodiment of a flexible slide mounting member according to the present invention is generally designated by reference numeral 10. FIG. 1 is a perspective view of a battery 20 having a pair of terminal posts (not shown) extending outwardly therefrom. Battery 20 includes a top surface 22 which is generally planar. As is known in the art, the distance between the terminal posts varies according to the size of the battery and batteries typically come in various sizes, such as 8 inch, 9 inch or 10 inch. Even within the same size application, e.g., 9 inch, there may be significant tolerance between the terminal posts which, until the present invention, has made the mounting of battery packages directly to top surface 22 a very difficult task because the battery packages needed to be electrically connected to the terminal posts and thus could not easily accommodate tolerances between the terminal posts.

An exemplary battery package is generally indicated at 30. Battery package 30 is electrically attached to the terminal posts (positive and negative) as will be described in greater detail hereinafter. Battery package 30 includes a first housing 32 and a second housing 34 which are coupled to one another by flexible slide mounting member 10 of the present invention. In an exemplary embodiment, battery package 30 is an electronics package and first housing 32 includes a mechanical compartment and second housing 34 includes an electronics compartment. First housing 32 includes a generally rectangular base compartment 36 having a first terminal cover member 38 which extends outwardly from one side 40 of base compartment 36 and a side mount fitting 42 extending outwardly from an opposing other side 44 of base compartment 36 towards second housing 34.

Base compartment 36 comprises a housing in which mechanical components of battery package 30 are disposed therein. First terminal cover member 38 comprises a generally U-shaped housing in the form of a leg extending from base compartment 36. First terminal cover member 38 is sized to be disposed on top of a first post terminal (not shown) of the battery. Preferably, the first post terminal comprises a positive terminal of battery 20. In a preferred embodiment, first terminal cover member 38 is integrally formed with base compartment 36. First terminal cover member 38 is intended to fully encase the first post terminal so that a consumer does not attempt to make an electrical connection between the first post terminal and another electrical conduit. The mechanical components disposed within first housing 32 typically include one or more bus bar assemblies and/or electrical switching devices. In order to electrically connect the mechanical components to the first terminal post, a terminal post connector (not shown) is used. Any number of suitable terminal post connectors may be used so long as the terminal post connector is designed so that an electrical connection is formed with the first terminal post and an electrical distribution system, e.g., bus bar assembly, may be attached to the first terminal post connector to thus provide power from the first terminal post to the electrical distribution system. One preferred terminal post connector is disclosed in a commonly assigned U.S. application Ser. No. 09/447,649 entitled "Battery Terminal Post Connector" which is hereby incorporated by reference in its entirety.

Side mount fitting 42 is in the form of an elongated member having an opening 47 extending therethrough so that one end 46 of side mount fitting 42 abuts against base compartment 36 and forms an entrance into a cavity formed within base compartment 36. The opposite end 48 of side mount fitting 42 comprises an open end which permits electrical equipment (e.g., wiring and the like) 69 to be routed between first housing 32 to second housing 34. In the illustrated embodiment, side mount fitting 42 comprises a member having a generally rectangular cross-section of sufficient width and height so that electrical wires 69 may be routed through the generally rectangular opening. An outer surface 50 of side mount fitting 42 has a predetermined number of grooves 90 running across a width of side mount fitting 42. At opposite end 48, side mount fitting 42 includes a grommet-type sealing member 49 which extends around a peripheral edge at opposite end 48. Grommnet-type sealing member 49 is formed of a suitable material, e.g., rubber, and is secured within a retaining groove formed in side mount fitting 42.

Referring to FIG. 1, a substitute first terminal post 60 is provided and electrically connected to the mechanical components disposed within central compartment 36. As shown, substitute first terminal post 60 includes a tong 62 which is electrically connected to and extends from the electromechanical components disposed within first housing 32. At one end of tong 62 is a post terminal 64 which is designed to provide the consumer with a useable post terminal connected to the positive lead of battery 20. Preferably, a substantial portion of substitute first terminal post 60 is disposed on top surface 22 of battery 20 to enable substitute first terminal post 60 to be supported by top surface 22 and permit the consumer to clamp an object with force to substitute first terminal post 60.

In the exemplary embodiment, second housing 34 is similar to first housing 32; however it is within the scope of the present invention that second housing 34 may be different than first housing 32 so long as both housings 32 and 34 are capable of being coupled to one another by the flexible mounting member 10 of the present invention. In the illustrated embodiment, second housing 34 includes a generally rectangular base compartment 70 having a second terminal cover member 72 which extends outwardly from one side 74 of base compartment 70 and a side mount fitting 76 extending outwardly from an opposing second side 78 of base compartment 70 towards first housing 32. Base compartment 70 comprises a housing in which electrical components of battery package 30 are preferably disposed and typically includes a circuit board (not shown) and the like. Preferably, the electronic components disposed within second housing 34 include one or more electronic modules (not shown). It being understood that first housing 32 and second housing 34 may include either electronic components or mechanical components or a combination thereof and the present invention is not limited to the exemplary embodiment shown herein.

Second terminal cover member 72 comprises a generally U-shaped housing in the form of a leg extending from base compartment 70. Second terminal cover member 72 is sized to encase a second post terminal (not shown) of battery 20. Preferably, the second post terminal comprises a negative terminal of battery 20. In a preferred embodiment, second terminal cover member 72 is integrally formed with base compartment 70. Second terminal cover member 72 is intended to fully encase the second post terminal to prevent the consumer from having access thereto and attempting to the second post terminal for an electrical connection. The electronics within base compartment 70 are grounded to the second post terminal by grounding a wire (not shown) from the circuit board to the second post terminal, wherein the wire is preferably routed within second terminal cover member 72 to the second post terminal which is disposed therein.

Referring to FIGS. 1–2, side mount fitting 76 of second housing 34 is essentially identical to side mount fitting 42 of first housing 32 and comprises an elongated member having an opening 77 extending therethrough so that one end 80 of side mount fitting 76 abuts against base compartment 70 and forms an entrance into a cavity formed within base compartment 70. The opposite end 84 of side mount fitting 76 is open-ended and is designed to permit electrical wiring 69 and the like to travel between first housing 32 and second housing 34. The electrical wires 69 provide power from the first post terminal (positive terminal) to the electrical components, e.g., circuit board, disposed in second housing 34 via the electromechanical components disposed within base compartment 36. Like side mount fitting 42, side mount fitting 76 has a generally rectangular crosssection. An outer surface 86 of side mount fitting 76 has a predetermined number of grooves 90 running across the width of side mount fitting 76. At opposite end 84, side mount fitting 76 includes a grommet-type sealing member 49 which extends around the peripheral edge at opposite end 84.

Referring to FIG. 1, a substitute second terminal post 94 is provided and electrically connected to the electrical components disposed within central compartment 70. As shown, substitute second terminal post 94 includes a tong 96 which extends from the first side cover member 38. At one end of tong 96 is a post terminal 98 which is designed to provide to the consumer a useable post terminal connected to the negative lead of battery 20. Preferably, a substantial portion of substitute second terminal post 94 is disposed on top surface 22 of battery 20 to permit the consumer to clamp an object with some force to substitute second terminal post 94.

Referring to FIG. 2, flexible slide mounting member 10 is provided in accordance with the present invention and comprises a generally rectangular cross-sectional member having a cavity 112 extending entirely therethrough so that flexible slide mounting member 10 is open-ended at both ends. Cavity 112 has a height greater than the height of side mount fittings 42 and 76 so that side mount fittings 42 and 76 are intimately received within cavity 112. Flexible slide mounting member 10 has at least one and preferably two or more raised rails 114 formed on an inner surface 116 thereof. Preferably, rails 114 are spaced along inner surface 116 and are orientated thereon. Rails 114 are formed of a suitable material and preferably are formed of an elastomeric material. Rails 114 intimately engage grooves 90 of side mount fittings 42 and 76, respectively, to adjustably and securely retain side mount fittings 42 and 76 within flexible slide mounting member 10.

Accordingly, flexible slide mounting member 10 is designed to provide adjustment of first and second housings 32 and 34 relative to the terminal posts of battery 20 by permitting first and second housing 32 and 34 to be positionable within flexible slide mounting member 10 so that a predetermined length of side mount fittings 42 and 76 extends from the end of flexible slide mounting member. Flexible slide mounting member 10 provides adjustment not only for the large variation in terminal post location but also for a range of battery sizes. In other words, the use of flexible slide mounting member 10 permits battery package 30 to be used with varying sized batteries, e.g., 8, 9, or 10 inch sizes, and the mounting of battery package 30 to the terminal posts of battery 20 is not substantially dependent upon the location of the terminal posts or the considerable tolerances which may exist between terminal posts.

Flexible slide mounting member 10 accommodates different sized batteries 20 by permitting one or more of first and second housings 32 and 34 to be properly positioned relative to flexible slide mounting member 10 by either extending the respective housing outward in a direction away from flexible slide mounting member 10 or inwardly retracting the respective housing within cavity 112 of flexible slide mounting member 10 to thereby reduce the length of the respective side mount fitting which extends from one of ends 91 of flexible slide mounting member 10.

To generally assemble the apparatus of the present invention, side mount fittings 42 and 76 are inserted into cavity 112 formed in flexible slide mounting member 10 so that an outermost rail 114 of flexible slide mounting member 10 engages an outermost groove 90 formed within side mount fittings 42 and 76 resulting in side mount fittings 42 and 76 being securely and adjustably retained within flexible slide mounting member 10. To reduce the overall length of battery package 30 as measured from the ends of first and second terminal cover members 38 and 72, at least one of side mount fitting 42 and 76 is inwardly directed within flexible slide mounting member 10 so that the outermost rail 114 of the respective side fitting mounting engages one of grooves 90 which is formed more towards the center of flexible slide mounting member 10 relative to the outermost groove 90. Accordingly, depending upon the size of battery 20 and the distance between the first and second post terminals, the overall length of battery package 30 is adjusted so that the battery package 30 properly fits on top surface 22 and mounts to the first and second post terminals. Flexible slide mounting member 10 of the present invention enables for packaging that is a "one size fits all" and accordingly, such a design minimizes proliferation.

The grommet-type sealing members 49 on side mount fittings 42 and 76, respectively, preserve the tightness of the locking fit between side mount fittings 42 and 76 and flexible slide mounting member 10. In addition, grommet-type sealing members 49 prevent any unwanted foreign matter from entering into either first or second housing 32 and 34. For example, it is important that grommet-type sealing members 49 provide splash protection so that water is prevented from entering either first or second housings 32 and 34, where sensitive electronics and other components are disposed.

Once flexible slide mounting member 10 is properly positioned relative to side mount fittings 42 and 76, flexible slide mounting member 10 may be further coupled to slide mount fittings 42 and 76 by using a fastener assembly (not shown). For example, a fastener, such as a bolt, may be disposed through a portion of flexible slide mounting member 10 and side mount fittings 42 and 76, wherein the fastener threadingly engages a nut or the like on the opposite side of the flexible slide mounting member 10 resulting in the flexible slide mounting member 10 and side mount fittings 42 and 76 be secured to one another.

Figure 3:
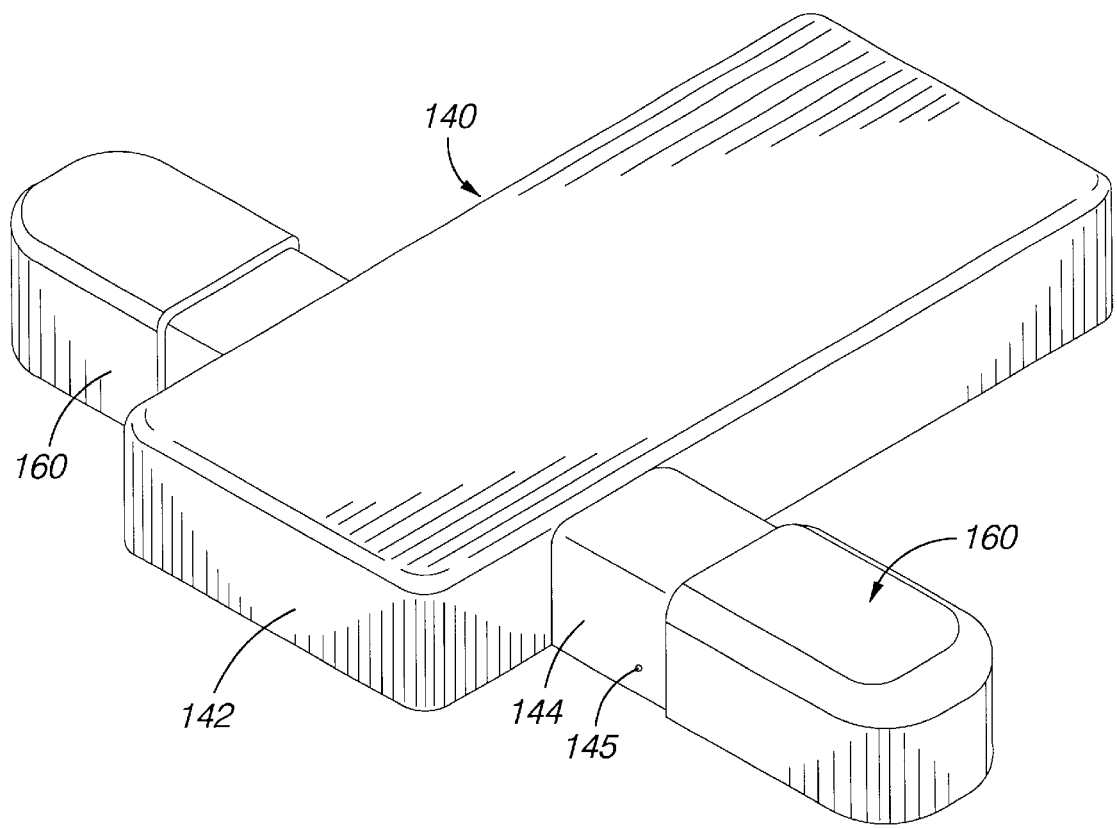
FIG. 3 is perspective view showing a top mounted battery unit with an expandable cover assembly.
Figure 4:
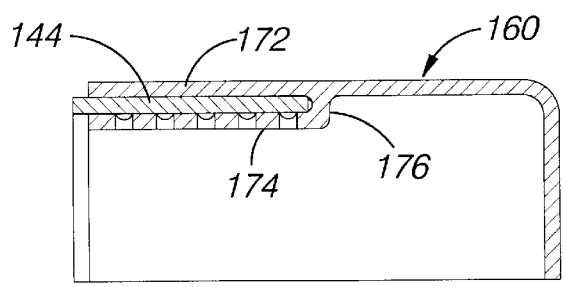
FIG. 4 is a partial side cross-sectional view of the battery unit of FIG. 4 showing the cover assembly in a retracted position.
Figure 5:
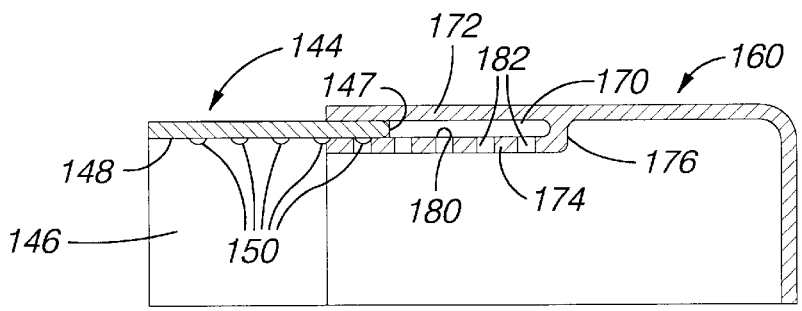
FIG. 5 is a partial side cross-sectional view of the battery unit of FIG. 4 showing the cover assembly in an expanded position.

Turning now to FIGS. 3–5 in which a second embodiment of the present invention is presented. A battery package of a second embodiment is generally indicated at 140 and includes a base compartment 142 and a pair of opposing side compartments 144 which comprise legs extending away from opposing sides of base compartment 142. In this embodiment, battery package 140 is a single housing package, wherein base compartment 142 houses both the mechanical components and electronics or other components of battery package 140.

Each of side compartments 144 comprises a generally U-shaped member having a channel extending therethrough and an inner retaining surface 148. Inner retaining surface 148 includes at least one and preferably a plurality of retaining rails 150 which in an exemplary embodiment comprise rails extending from and raised relative to inner retaining surface 148. Retaining rails 150 are preferably identical to rails 114 and preferably are formed of an elastomeric material. Side compartments 144 are sized so that a battery terminal post connector(s) and any terminal post connector hardware (not shown) may be disposed therein between walls 145 which defines side compartment 144. In addition, side compartments 144 are designed to accommodate the battery terminal posts (not shown) of the battery.

In this embodiment, a pair of terminal covers 160 are adjustably retained to the pair of side compartments 144. More specifically, each of terminal covers 160 includes a retaining slot 170 formed by an outer wall 172 and an inner wall 174. Inner wall 174 is attached to outer wall 172 by a connecting wall 176 which also serves as an end wall for retaining slot 170. Preferably, connecting wall 176 is integral to inner wall 174 and outer wall 172. Retaining slot 170 is sized so that side housing 144 is received therein as terminal cover 160 slidably engages and is retained to side compartment 144. An upper surface 180 of inner wall 174 includes a predetermined number of grooves 182 formed therein. Grooves 182 extend across upper surface 180 within retaining slot 170 and are designed to complementarily engage rail 150. Grooves 182 are spaced accordingly along upper surface 180 so that the overall width of electronics package 140, as measured between the ends of terminal covers 160, is adjustable between one or more desired positions by engaging rail 150 within the corresponding groove 182.

Terminal covers 160 are designed to that they provide adjustment of battery package 140 relative to the terminal posts of a battery (not shown) by permitting terminal covers 160 to be positionable relative to side compartments 144 so that a predetermined length of each of the terminal overs 160 extends from end 147 of side compartments 144. Accordingly, terminal covers 160 provide adjustment not only for the large variation in terminal post location but also for a range of battery sizes. In other words, the use of adjustable terminal covers 160 permits battery package 140 to be used with varying sized batteries, e.g., 8, 9, or 10 inch sizes, and the mounting of battery package 140 to the terminal posts of the battery is not dependent upon the location of the terminal posts or the considerable tolerances which may exist between terminal posts.

It is further understood that it is within the scope of the present invention that adjustable terminal covers 160 may be applied to a corresponding pair of side compartments 144 as shown in FIG. 3 or may be applied only to a single side compartment 144 in which the other second side compartment does not have an adjustable cover but rather includes a simple housing member.

In accordance with the present invention, battery packages 30 and 140 of FIGS. 1–5 are made from a number of suitable materials, including but not limited to plastic materials and metals. In one exemplary embodiment, battery packages 30 and 140, including the flexible slide mounting members, are formed of aluminum. Flexible slide mounting member 10 also serves as a mechanical hold-down for battery package 30. However, it is within the scope of the present invention that battery packages 30 and 140 may be held down by an additional fastener, e.g. a hook and loop fastener.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A battery mounting member for adjustably retaining first and second housings of a battery package, comprising:
   at least one first housing and one second housing, and
   a body including a central opening extending therethrough, the body having a wall with an inner surface defining the central opening, the inner surface including a predetermined number of rails extending outwardly therefrom within the central opening for retainingly engaging complementary grooves formed in portions of the first and second housings which are received within the opening of the body so that the body is adjustable with respect to the first and second housings and serves to secure the first and second housings to one another.

2. The battery mounting member as set forth in claim 1, wherein the body has a generally rectangular cross section.

3. The battery mounting member as set forth in claim 1, wherein the rails longitudinally extend across the inner surface of the body.

4. The battery mounting member as set forth in claim 3, wherein the rails are parallel to one another.

5. The battery mounting member as set forth in claim 1, wherein the rails are formed of an elastomeric material.

6. The battery mounting member as set forth in claim 1, wherein the portion of each of the first and second housings which is received within the central opening comprises a side mount fitting extending outwardly from one of the first and second housings, the side mount fitting having an opening extending therethrough so that battery accessories may be routed therethrough between the first and second housings.

7. The battery mounting member as set forth in claim 6, wherein each of the side mount fittings includes an outer surface having a predetermined number of retaining grooves formed therein, the retaining grooves being longitudinally arranged across the outer surface.

8. The battery mounting member as set forth in claim 6, wherein each of the side mount fittings includes a grommet type sealing member at an end which is inserted within the central opening of the body of the battery mounting member.

9. The battery mounting member as set forth in claim 6, wherein the side mount fittings have a generally rectangular cross section.

10. An adjustable battery package for mounting to a top surface of a battery, comprising:

a housing having at least one side compartment extending from and in communication with a base compartment, the at least one side compartment defined by a wall having an inner surface which includes a predetermined number of retaining rails extending outwardly from the inner surface; and a terminal cover adjustably retained to the at least one side compartment, the terminal cover including a retaining slot for receiving a portion of the at least one side compartment, the retaining slot defined by a first surface having a predetermined number of retaining grooves formed therein, the terminal cover being adjustably retained to the side compartment by retainingly engaging the retaining rails with the retaining grooves, wherein the complementary retaining rails and grooves permit the terminal cover to be adjustable relative to the at least one side compartment so that a distance between an outer end of the terminal cover and the housing may be increased or decreased by adjustment of the terminal cover.

11. The adjustable battery package as set forth in claim 10, wherein the at least one side compartment comprises a generally U-shaped member.

12. The adjustable battery package as set forth in claim 10, wherein the retaining rails extend longitudinally across the inner surface of the side compartment.

13. The adjustable battery package as set forth in claim 10, wherein the retaining grooves extend longitudinally across the first surface of the terminal cover.

14. The adjustable battery package as set forth in claim 10, wherein the retaining rails are formed of an elastomeric material.

* * * * *